F. C. GREENE & C. G. PALMER.
AUTOMATIC CAR DUMPING MECHANISM.
APPLICATION FILED AUG. 18, 1905.

1,005,961.

Patented Oct. 17, 1911.
6 SHEETS—SHEET 3.

WITNESSES:

INVENTORS
Frank C. Greene
Charles G. Palmer
by J. O. Fay
THEIR ATTORNEY

F. C. GREENE & C. G. PALMER.
AUTOMATIC CAR DUMPING MECHANISM.
APPLICATION FILED AUG. 18, 1905.
1,005,961.
Patented Oct. 17, 1911.
6 SHEETS—SHEET 5.
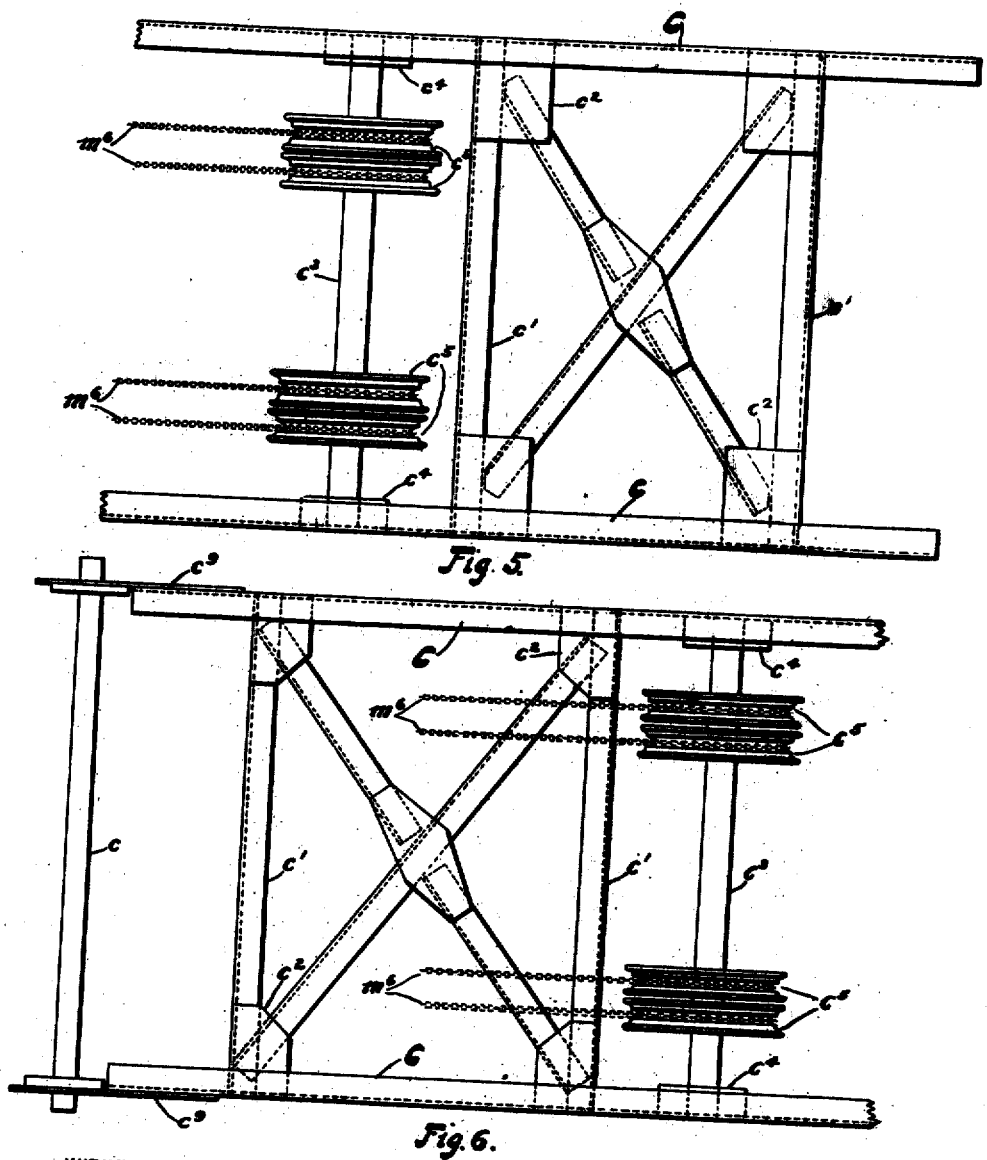

F. C. GREENE & C. G. PALMER.
AUTOMATIC CAR DUMPING MECHANISM.
APPLICATION FILED AUG. 18, 1905.
1,005,961.
Patented Oct. 17, 1911.
6 SHEETS—SHEET 6.
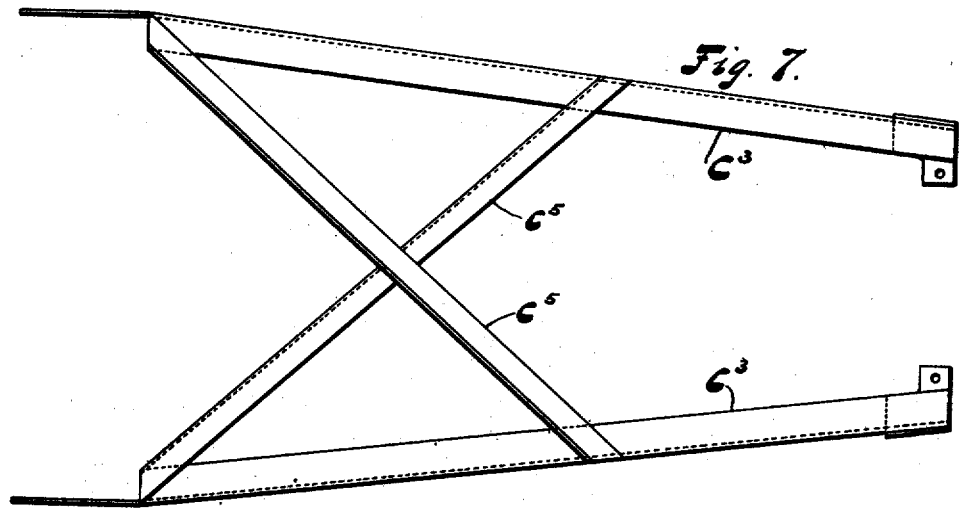
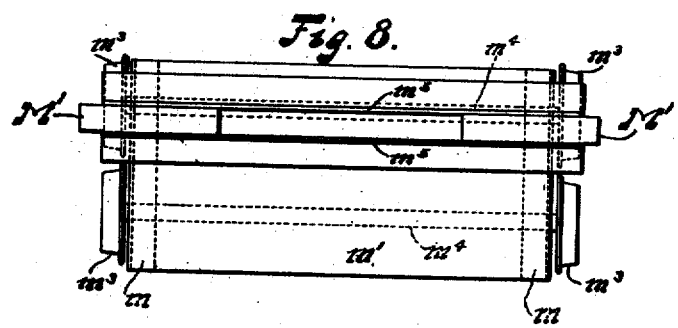
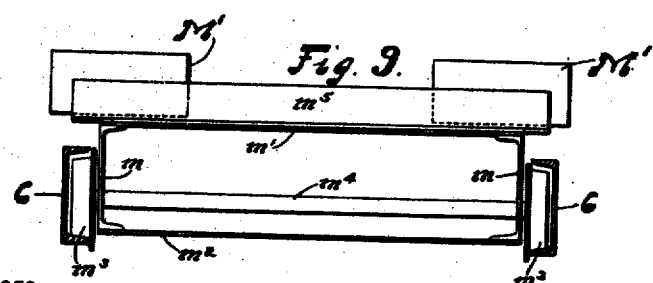

UNITED STATES PATENT OFFICE.

FRANK C. GREENE, OF CLEVELAND, AND CHARLES G. PALMER, OF EAST CLEVELAND, OHIO; SAID PALMER ASSIGNOR TO SAID GREENE.

AUTOMATIC CAR-DUMPING MECHANISM.

1,005,961.

Specification of Letters Patent.    Patented Oct. 17, 1911.

Application filed August 18, 1905. Serial No. 274,683.

*To all whom it may concern:*

Be it known that we, FRANK C. GREENE and CHARLES G. PALMER, both citizens of the United States, residents of Cleveland and East Cleveland, respectively, county of Cuyahoga, and State of Ohio, have invented a new and useful Improvement in Automatic Car-Dumping Mechanism, of which the following is a specification, the principle of the invention being herein explained and the best mode in which we have contemplated applying that principle, so as to distinguish it from other inventions.

Our invention relates to mechanism for dumping cars and especially to mechanism for dumping coal cars in the tipple of a coal mine. But while the description which follows refers to our invention as applied to this particular situation, it will be evident that practically the only modification required to adapt it for handling other kinds of cars or trucks would be a variation in the size and strength of the structural materials employed.

The object of the invention is to provide a car dump that will be automatic and efficient in its operation, and withal simple and economical in construction.

To the accomplishment of this end it consists of means hereinafter fully described and particularly set forth in the claims.

The annexed drawings and the following description set forth in detail certain mechanism embodying the invention, such disclosed means, however, constituting but one of various mechanical forms in which the principle of the invention may be used.

Figure 1:
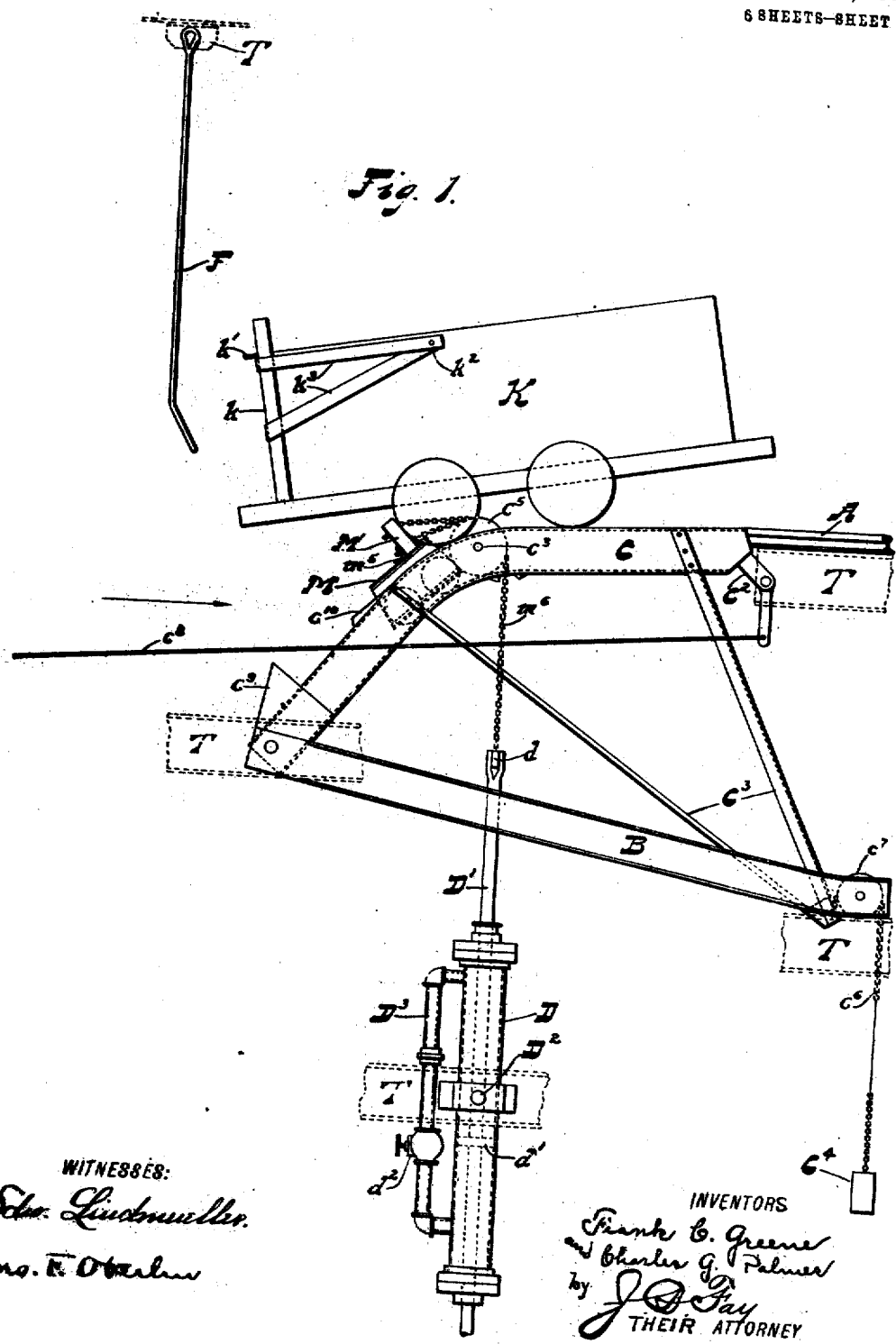
Figure 2:
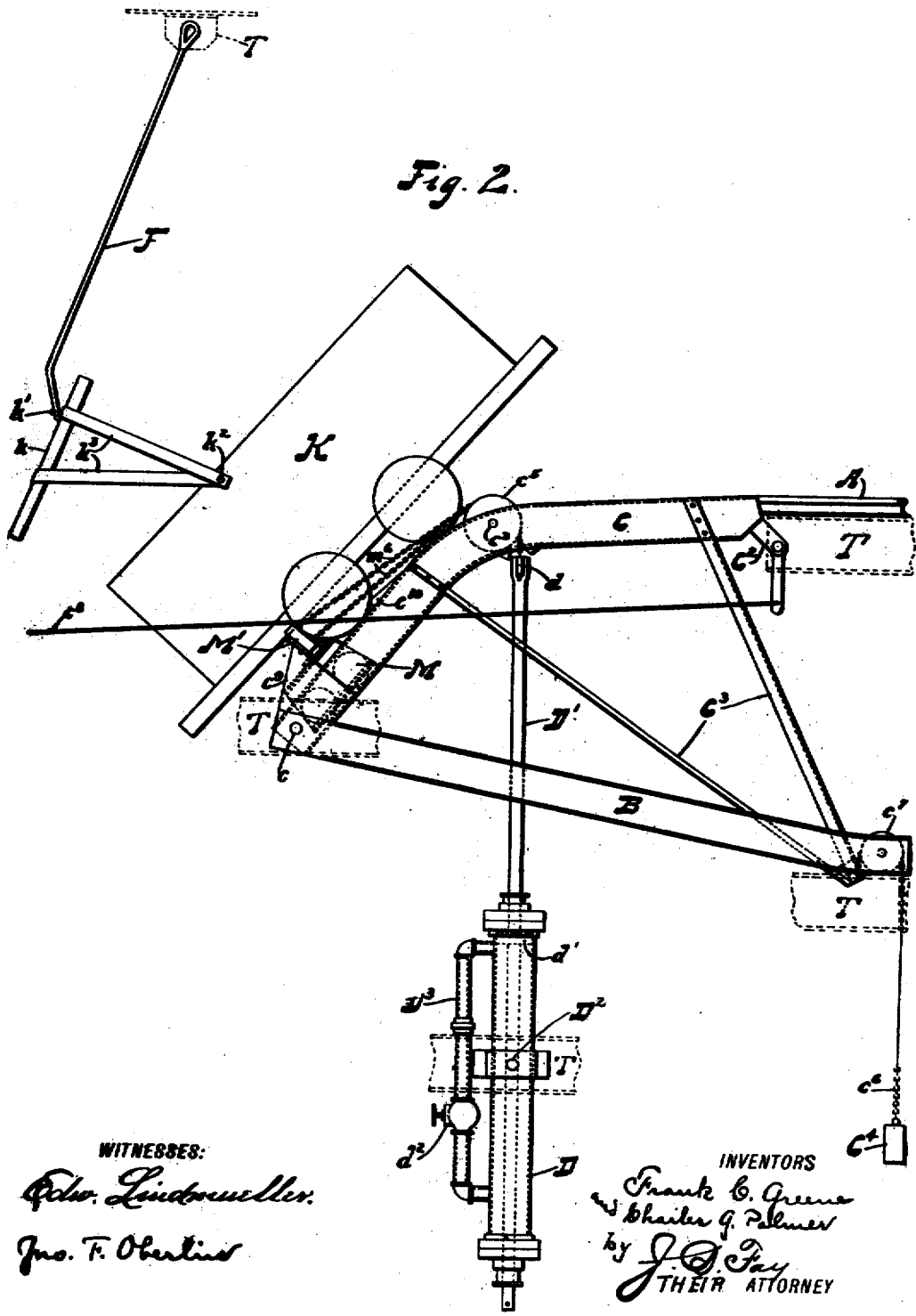
Figure 3:
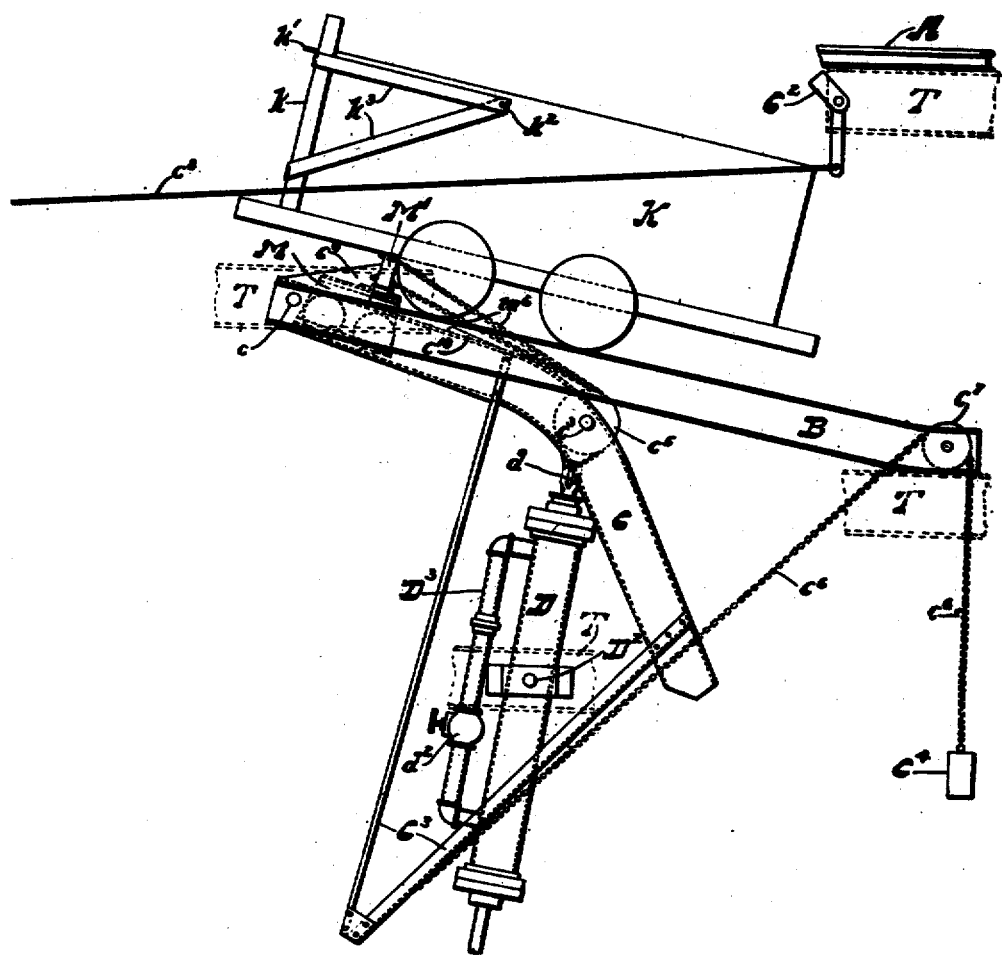
Figure 4:
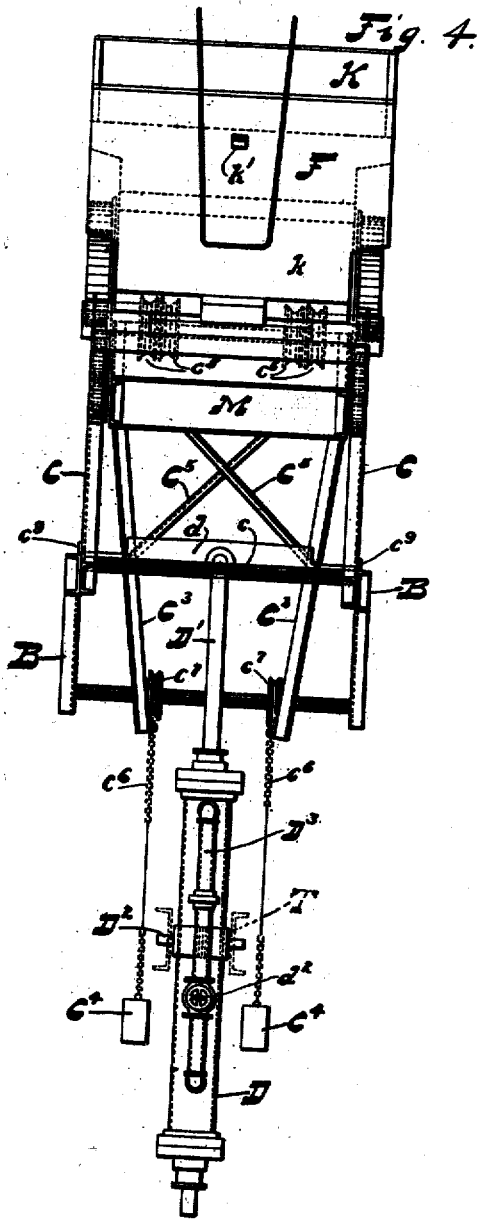

In said annexed drawings: Figures 1, 2 and 3 represent our improved dumping mechanism in side elevation, Fig. 1 showing its position previous to and pending the reception of a car, Fig. 2, its position while the car is being dumped, and Fig. 3, its position as the car is being placed on the car discharge track: Fig. 4 represents an end elevation of the mechanism in the position, and as viewed in the direction indicated by the arrow in Fig. 1; Figs. 5 and 6 represent in plan view the rear and front portions respectively of the frame of the dumping mechanism, the central portion thereof appearing in both figures; Fig. 7 represents in plan an angle frame which is attached to such dumping frame and to which counterweights are designed to be attached; and Figs. 8 and 9 represent in plan and front elevation respectively a buggy which travels on the frame of the dumping mechanism and holds the car while thereon.

The central feature of our improved dumping mechanism is a dumping frame C pivotally mounted at one end on a horizontal shaft $c$ so as to be capable of vibration or oscillation vertically. The loaded cars K are received on this frame from the car delivery track A and after being automatically dumped of their contents, are placed by such frame upon the car discharge track B. Associated with the dumping frame proper are various accessory parts, the principal of which are a latch $C^2$ for retaining the free end of the dumping frame in register with the car delivery track, a swinging catch F for raising the end-gate of the car, and a cylinder D and piston $D^1$, and a system of counterweights $C^4$, for regulating the motion of the dumping frame C as it vibrates on axis $c$. All of the above parts are suitably supported in the frame of the coal tipple, broken sections of such supporting structure, designated by T, being shown in the various figures.

The dumping frame comprises two side members C, Figs. 5 and 6, of channel iron with the channels turned inwardly, and bent in the manner clearly shown in Figs. 1, 2 and 3. These side members C are secured together by means of cross bars $c^1$, and the frame thus formed is laterally stiffened by means of gusset plates $c^2$ and lacing as shown. Through bearings formed in the lower ends of the two side members, passes the shaft $c$ already referred to, the ends of which are supported on car discharge track B or in such other suitable frame work as may be provided. Another shaft $c^3$ turning in bearings $c^4$ provided in the same side members C at the point where they are bent has disposed upon it four pulleys $c^5$ as shown in Figs. 5 and 6.

Running on the inside of the channels of side members C between shaft $c^3$ and the lower end of the frame is a buggy or carriage M that as will later appear constitutes in effect a movable stop for checking the movement of the car down the inclined portion of the dumping frame. As shown in detail in Figs. 8 and 9, this buggy or carriage is composed of channels $m$ $m$ connected by top plate $m^1$ and bottom plate $m^2$, and provided with bearings for two shafts $m^4$ on the projecting ends of which are mounted the wheels $m^3$ on which the buggy runs. These wheels are small enough to fit within the channels of side members C and it is thus seen that while the lower tongue of such channel serves as a track for the buggy the upper tongue at the same time prevents the buggy from being thrown off such track.

Extending beyond the body of the buggy one on each side, are blocks $M^1$ which are rigidly secured to the top plate $m^1$ of the buggy by means of angle irons, $m^5$. Chains or cables $m^6$ are secured to the buggy, preferably to the blocks $M^1$, as shown, two to each one, which thence pass over pulleys $c^5$ already described and are attached at their other extremities to a cross bar $d$. Two of these chains, one on each side are slightly longer than the other two and so normally run slack, the purpose being that they should carry no load except in case the regular chain should break. The cross bar $d$ is pivotally attached at its mid-point to the upper end of piston $D^1$, the head $d^1$ of which operates in a cylinder D, Figs. 1, 2 and 3. This cylinder D is mounted on a trunnion $D^2$ and is provided with a pass pipe $D^3$ connected as shown and having a valve $d^2$. The cylinder being filled with oil, it is obvious that the movement of the piston, and thereby of the buggy M down the inclined portion of the dumping frame C is readily controlled by properly regulating valve $d^2$, or such movement may be entirely checked or stopped if desired by simply closing said valve. The purpose of such control will appear later in the description of the manner of operation of the dumping mechanism.

For returning the pivoted dumping frame C to its normal position as shown in Figs. 1 and 2, a set of counterweights $C^4$ is provided. These weights are attached to the ends of chains $c^6$ running over pulleys $c^7$ and secured at their other ends to the lower extremities of angle frames $C^3$ which project downwardly from side members C of the dumping frame. As the frame is thus returned to such upper and normal position it engages latch $C^2$ and is locked securely in place thereby. Guides, not shown, protected by rubbing plates, provide for any play due to wear, or improper adjustment of the axle on which the dumping frame is pivoted by directing the ends of the frame to a position to register exactly, with the car delivery track. Latch $C^2$ is released and the dumping frame allowed to drop to the position shown in Fig. 3 by means of a link $c^8$, controlled by the operative supervising the dumping of the cars.

The remaining structural details of our improved dumping mechanism are best described in connection with its mode of operation which we shall now indicate.

The car K as it comes loaded from the mine rests upon delivery track A. When it is desired to empty it, it is shoved from this track on to the upper portion of dumping frame C, the side members of which, in such frame's usual position, form as before indicated a continuation of delivery track A. This upper portion of the frame, as shown in Figs. 1 and 2 inclines downwardly at a slight grade so that, once thereon, the car continues its course under the action of gravity. For that matter the delivery track A may be similarly inclined from whatever point it may be considered desirable or convenient to "feed" the cars to the dumping mechanism. Upon reaching the bent portion of the frame, where the track curves sharply downward the car encounters the buggy M, which as will appear, is normally positioned at this point and constitutes, along with the inclined portion of the oscillatory track section, means for tilting the car upon its entrance on such track section. The front wheels of the car rest against the blocks $M^1$ of such buggy which are suitably conformed to receive the wheels, and buggy and car together descend this portion of the frame at a rate of speed depending upon the adjustment of the speed regulating device comprising piston $D^1$ and cylinder D. If for any reason the coal in the car is not readily dislodged it may be desirable to impart a jerky or spasmodic movement to the same. This is readily effected by alternately closing and opening the valve $d^2$ in the pass-pipe of said cylinder. The downward movement of the car may thus be interrupted as often as necessary before it reaches its final lower position, and the coal be thus caused to pass therefrom in an even stream and not in one mass, as might be the case were reliance wholly placed on the shock of stopping the carriage M at the bottom of the inclined track-section to secure the discharge of the coal. Coincidently with the arrival of piston $D^1$ at its upper limit of travel, the downward motion of the buggy and car is limited by a stop $c^9$, Fig. 2, formed by extending the lower gusset plates of the dumping frame above the side members of the frame. The angle of inclination of that portion of dumping frame C in which buggy M runs is such that the contents of the car while thereon will be discharged from the lower end upon the end-gate $k$ being raised. This end-gate is attached to the car by means of rearwardly extending angle-frames $k^3$ pivoted to the sides of the car at $k^2$, and is automatically raised when the car is in the position just described by means of swinging catch F which is disposed to engage a pin $k^1$, projecting from the front of the end-gate, as the car descends the dumping frame. Tapered blocks $c^{10}$ disposed on this portion of dumping frame C as shown, Fig. 1, serve to jar the car and, by thus loosening the coal, to automatically facilitate its discharge from the car, thus supplementing the means above described as available for this purpose. It is contemplated, in fact, that these blocks will ordinarily suffice to accomplish the object in question. The term "jarring means" accordingly will be hereinafter employed in a generic sense to designate either one or both of the two specific agencies that are provided to so affect the car as to loosen its contents. Said block $c^{10}$ also serve the further purpose of retaining the car upon the dumping frame, during the downward movement of the frame, until the car stands on the discharge track B. Upon the car being emptied in the manner just described the operative supervising the mechanism releases latch $C^2$ by means of link $c^8$. When the dumping frame C is thus left free to vibrate upon its axis $c$, the added weight of the car overcomes counterweights $C^4$ and causes the frame to descend to the position shown in Fig. 3. During such descent the upper portions of side members of frame C rest upon cross bar $d$ attached to the piston $D^1$, which as just described and shown in Fig. 2 has been raised to its upper position by the movement of buggy M under the influence of loaded car K. The rate of speed of such downward movement of piston $D^1$ is of course regulated in the same fashion as was its upward movement by means of valve $d^2$ in pass-pipe $D^5$. The vibratory dumping frame C swings within the rails of discharge track B which, as shown in Fig. 4, are preferably made of channel iron with the flanges turned outwardly, and the distance between these rails and the width of the upper sides of the inwardly disposed channels of frame C are so proportioned that upon the depression of the frame to its lower position, Fig. 3, the treads of the car wheels rest upon the rails of discharge track B. In this way the track on such dumping frame is in effect brought into register with such discharge track which constitutes the lower of the two superposed tracks, whereby register is meant working relation. The track B is inclined sufficiently to cause the car to move off under the influence of gravity upon the regular track or upon a switch to be returned to the mine when desired. So soon as it is relieved of the weight of the car, frame C is free to respond to the action of counterweights $C^4$ and return to its upper position. This upward movement is not retarded until the slack has been taken out of chains $m^6$ and the buggy M returned to its upper position. Through the remainder of its upward swing the motion of the frame is regulated by piston $D^1$ which is designed to travel about half the length of the cylinder. The "up" stroke of the piston is completed, as has been seen, when the buggy M is borne down the dumping frame by the loaded car. The guides before described, direct the free ends of the side members into register with the rails of delivery track A, whereupon the latch $C^2$ automatically drops in place and locks the frame and one cycle of operation is thus completed.

It it thus seen that our improved car-dumping mechanism is entirely automatic in its operation, obviating entirely the use of power to run it, and requiring the attention of but a single operative who may be stationed at any distance away from it where most convenient. At the same time it is simple and economical in its construction.

Having thus described our invention in detail, that which we particularly point out and distinctly claim, is:

1. In car-dumping mechanism, the combination with a track, of a track-section oscillatory about an axis removed from said track adapted in one position to register with said track and when so registering to incline downwardly therefrom at an angle sufficient to dump a car.

2. The combination with two superposed tracks, of car-dumping mechanism comprising an oscillatory track-section adapted to register with the upper of said tracks to receive a car therefrom and when so registering to incline downwardly from said track at an angle sufficient to dump a car, such track-section being adapted in another position to register with the lower of said tracks and place such car thereon.

3. The combination of a car delivery track, a car discharge track beneath such delivery track, and car-dumping mechanism comprising an oscillatory track-section normally inclining downwardly from said delivery track at an angle sufficient to dump a car, said track-section being adapted to receive a car from said delivery track and place it on said discharge track.

4. In car-dumping mechanism, the combination with a track, of an oscillatory track-section adapted in one position to register with said track, the axis of said track-section being spaced from the end of said track and lying below the line of the latter, so as to cause said track-section, when so registering with said track, to incline downwardly therefrom at an angle sufficient to dump a car.

5. In car-dumping mechanism, the combination with two superposed tracks, of an oscillatory track-section adapted in different angular positions about its axis to register with said tracks respectively, the axis of said track-section being spaced from the end of the upper of said tracks and lying below the line of the same, so as to cause said track-section, when so registering therewith, to incline downwardly therefrom at an angle sufficient to dump a car.

6. In car-dumping mechanism, the combination with two superposed tracks, of an oscillatory track-section adapted in different angular positions about its axis to register with said tracks respectively, the axis of said track-section being spaced from the end of the upper of said tracks and lying substantially on a line with the lower thereof.

7. In car-dumping mechanism, the combination with two superposed tracks; of an oscillatory track-section adapted in different angular positions about its axis to register with said tracks respectively, the axis of said track-section being spaced from the end of the upper of said tracks and lying substantially on a line with the lower thereof; and means normally retaining said track-section in register with such upper track.

8. In car-dumping mechanism, the combination with two superposed tracks; of an oscillatory track-section adapted in different angular positions about its axis to register with said tracks respectively, the axis of said track-section being spaced from the end of the upper of said tracks and lying substantially on a line with the lower thereof; and means normally retaining said track-section in register with such upper track, the weight of a car on said track-section being sufficient to depress the same into register with such lower track.

9. In car-dumping mechanism, the combination with a downwardly inclined track and an upwardly inclined track therebelow, of an oscillatory track-section adapted in different positions about its axis to register with said tracks, respectively, the axis of said track-section being spaced from the end of the upper of said tracks and lying substantially on a line with the lower thereof, whereby a car received on said track-section from such upper track is dumped and transferred onto said lower track.

10. The combination with a track, of car-dumping mechanism comprising a track-section registering with said track and inclining downwardly therefrom at an angle sufficient to dump a car of its contents, and means adapted to control the movement of a car upon such track-section.

11. The combination with a track, of car-dumping mechanism comprising an oscillatory track-section adapted in one position to register with said track and when so registering to incline downwardly therefrom at an angle sufficient to dump a car of its contents, and means adapted to control the movement of a car upon said track-section.

12. The combination with two superposed tracks, of car-dumping mechanism comprising an oscillatory track-section adapted in one position to receive a car from the upper of said tracks and in another position to place such car upon the lower of said tracks; said track-section when in such first position inclining downwardly from said upper track at an angle sufficient to dump a car of its contents, and means adapted to control the movement of a car upon said track-section.

13. In car-dumping mechanism, the combination of a track-section inclining downwardly whereby a car received thereon is adapted to be dumped of its contents, and a member movable along said track-section, said member being adapted to engage a car upon entrance of the latter onto said track-section and to control its movement therealong.

14. In car-dumping mechanism, the combination of an oscillatory track-section, said track-section in one position inclining downwardly whereby a car received thereon is adapted to be discharged of its contents, a stop movable along said track-section, said stop being adapted to engage a car upon entrance of the latter onto said track-section, and means for regulating the movement of said stop to thereby control the movement of said car.

15. In car-dumping mechanism, the combination of an oscillatory frame provided with a fixed stop, and a movable stop wherewith a car upon said track-section has prior engagement.

16. In car-dumping mechanism, the combination of an oscillatory track-section provided with a fixed stop, a movable stop wherewith a car upon said track-section has prior engagement, and means for regulating the movement of said last named stop.

17. In car-dumping mechanism, the combination of an oscillatory frame bearing a track-section, such track-section in one position of said frame inclining in one direction and in another position of said frame inclining in another direction, and a movable stop adapted to engage a car upon its entrance onto said track-section when the latter is inclined in said first direction, and to control the movement of such car down said track-section thus inclined.

18. The combination of a car delivery track, a car discharge track beneath such delivery track, and car-dumping mechanism comprising an oscillatory frame bearing a track, such track in the normal position of said frame registering with and inclining downwardly from such delivery track, and being adapted in another position of said frame to place a car received from said delivery track upon said discharge track; a movable stop adapted to engage such car while on such inclined track; and means for regulating the motion of said stop.

19. In car-dumping mechanism, the combination of a track; a track-section pivotally mounted at its outer end on a transverse axis and adapted in one angular position about such axis to register with said track, and to incline downwardly therefrom, whereby a car received thereon is adapted to be discharged of its contents; and a movable stop adapted to engage a car upon its entrance onto said track-section, and to control the movement of such car down said track-section when thus inclined.

20. In car-dumping mechanism, the combination of two superposed tracks; a track-section pivotally mounted at its outer end on a transverse axis and adapted in different angular positions about such axis to register with the respective tracks, said track-section inclining downwardly from the upper of said tracks when in register therewith whereby a car received thereon is adapted to be discharged of its contents; and a movable stop adapted to engage a car when upon said track-section.

21. The combination of a car delivery track, a car discharge track beneath such delivery track, and car-dumping mechanism comprising an oscillatory frame bearing a track, such track in the normal position of said frame registering with and inclining downwardly from such delivery track, and being adapted in another position of said frame to place a car received from said delivery track upon said discharge track; a movable stop to engage such car while on such inclined track; and means for positioning said stop and regulating the motion thereof.

22. The combination of a car delivery track, a car discharge track beneath such delivery track, and car-dumping mechanism comprising an oscillatory frame bearing a track, such track in the normal position of said frame registering with and inclining downwardly from, such delivery track, and being adapted in another position of said frame to place a car received from said delivery track upon said discharge track; a movable stop to engage such car while on such inclined track; a fixed stop to engage said movable stop; and means for positioning said movable stop and regulating the motion thereof.

23. In car-dumping mechanism, the combination of an oscillatory track-section, provided with a fixed stop, and a traveling carriage mounted on said track-section and adapted to engage a car when upon the same, said stop engaging in turn said carriage.

24. In car-dumping mechanism, the combination of a track, a track-section inclining downwardly therefrom whereby a car received thereon is adapted to be discharged of its contents, a traveling carriage mounted on said track-section and adapted to engage such car, and means adapted to control the movement of said carriage on said frame.

25. The combination of a track, a track-section inclining downwardly therefrom, a carriage traveling on said track-section and adapted to engage a car entering upon the same, and means controlling the movement of said carriage on said track-section, such means including a cylinder provided with a pass-pipe, a piston working in said cylinder, and means connecting said piston with said carriage.

26. The combination of a car delivery track, a car discharge track, an oscillatory track-section normally registering with said car delivery track and adapted to register with said car discharge track, and a carriage traveling upon said track-section and adapted to engage a car entering upon the same.

27. The combination of a car delivery track, a car discharge track, an oscillatory track-section normally registering with said car-delivery track and adapted to register with said car discharge track, a carriage traveling upon said track-section and adapted to engage a car entering upon the same, and means controlling the movement of said carriage on said track-section.

28. The combination of two superposed tracks, an oscillatory track-section adapted to register with the respective tracks, said track-section inclining downwardly from the upper of said tracks when in register therewith, a carriage mounted on said track-section and adapted to engage a car thereon, and means controlling the movement of said carriage on said track-section, such means including a cylinder provided with a pass pipe, a piston working in said cylinder, and means connecting said piston with said carriage.

29. The combination of a car delivery track, a car discharge track, an oscillatory frame, including a track normally registering with said delivery track, and adapted to register with said discharge track, a carriage traveling upon said frame and adapted to be engaged by a car upon said frame-track, means for controlling the movement of said carriage in said frame, counterbalancing means for maintaining said frame in its normal position and independently controlled means for locking said frame in such position.

30. The combination of a car delivery track, a car discharge track, an oscillatory frame, including a track normally registering with said delivery track and adapted to register with said discharge track, a carriage traveling upon said frame and adapted to be engaged by a car upon said frame-track, means for controlling the movement of said carriage on said frame, counterbalancing means for maintaining said frame in its normal position, and manually-controlled means for locking said frame in such position.

31. The combination of a car delivery track, a car discharge track, an oscillatory frame bearing a track normally registering with said first-named track, and having a downwardly inclined portion, means for controlling the movement of cars down such inclined portion, and locking means for holding said frame in its normal position, said frame being adapted when oscillated to place such downwardly inclined track-portion in substantially the same plane with said discharge track.

32. The combination of a car delivery track, a car discharge track, an oscillatory frame including a track normally registering with said first-named track, and having a downwardly inclined portion, means for controlling the movement of cars down such inclined portion, and manually-operable locking means for holding said frame in its normal position, said frame being adapted when oscillated to place such downwardly inclined track-portion in substantially the same plane with said discharge track.

33. In car-dumping mechanism, the combination with an oscillatory track-section provided at one end with a stop; of a block intermediate between the ends of said track-section adapted to jar a car incidentally to its movement therealong.

34. In car-dumping mechanism, the combination with an oscillatory track-section provided with stop means adapted to retain a car on said track-section when the latter is inclined in opposite directions respectively.

35. The combination in car-dumping mechanism of an oscillatory frame bearing a track, such track in one position of said frame inclining in one direction, and in another position of said frame inclining in another direction; a movable stop adapted to engage a car upon said track when inclined in said first direction; and a block upon said track adapted to engage such car when said track is inclined in the other direction.

36. In car-dumping mechanism, the combination with an oscillatory track-section provided with a stop movable therealong and adapted to engage a car when said track-section is inclined in one direction, a fixed stop adapted to limit the movement of said movable stop, and a block on said track-section adapted to jar a car incidentally to its passage thereover, and to engage such car as a stop when said track-section is inclined in the opposite direction.

37. In car-dumping mechanism, the combination with a track, of a track-section vertically movable with respect to the same, the rails of said track-section being so disposed as to move between the rails of said track, whereby a car borne by the former is placed on the former upon the downward movement of said track-section.

38. In car-dumping mechanism, the combination with a track, of a track-section oscillatorily mounted so as to be vertically movable with respect to and past said track, the rails of said track-section being so disposed as to swing within the rails of said track, whereby a car borne by the former is placed on the latter upon the downward oscillation of said track-section.

39. In car-dumping mechanism, the combination with an inclined car discharge track, of an oscillatory frame bearing a track and adapted to swing within the rails of said discharge track, whereby a car borne on said frame-track is placed on said discharge track upon the depression of said frame, and a block upon said frame-track adapted to retain such car thereon pending said depression.

40. The combination with two superposed tracks, of car-dumping mechanism comprising an oscillatory track-bearing frame normally registering with the upper of said tracks and adapted when depressed to swing between the rails of the lower of said tracks.

41. The combination of a car-delivery track, a car discharge track beneath said delivery track, and a track-section pivotally mounted so as to swing within the rails of said discharge track, and adapted to normally register with said delivery track.

42. The combination with two superposed tracks, of car-dumping mechanism comprising an oscillatory track-bearing frame normally registering with the upper of said tracks and inclining downwardly therefrom, whereby a car received thereon is adapted to be discharged of its contents, such frame being adapted when depressed to swing between the rails of the lower of said tracks and place such car thereon.

43. The combination with two superposed tracks, of car-dumping mechanism comprising an oscillatory track-bearing frame normally registering with the upper of said tracks and inclining downwardly therefrom, whereby a car received thereon is adapted to be discharged of its contents such frame being adapted when depressed to swing between the rails of the lower of said tracks and place such car thereon, a movable stop on said frame adapted to engage such car when said frame registers with said upper track, and a fixed stop on said frame adapted to engage such car pending the depression of the same.

44. In car-dumping mechanism, the combination with an oscillatory track-section, of an automatic retarding device adapted to control the motion of said track-section during its downward swing and the latter part of its upward swing only.

45. The combination of a car delivery track; a car discharge track; and car-dumping mechanism comprising an oscillatory track-section adapted to transfer a car from said delivery track to said discharge track, and means for regulating the motion of said track-section, such means including a cylinder provided with a pass-pipe and a piston working in said cylinder.

46. The combination of a car delivery track, a car discharge track beneath such delivery track, and car-dumping mechanism comprising an oscillatory frame adapted to receive a car from said delivery track and place it upon said discharge track, and means for regulating the motion of said frame, such means including a cylinder provided with a pass-pipe and a piston working in said cylinder.

47. The combination of a car delivery track, a car discharge track beneath such car delivery track, and car-dumping mechanism comprising an oscillatory track-bearing frame resting normally in register with such delivery track and adapted to be depressed by the weight of a car to register with such car discharge track, and means for regulating the motion of such frame, such means comprising a cylinder provided with a pass-pipe and a piston working in said cylinder.

48. In car-dumping mechanism, the combination of an oscillatory track-section, means for regulating the movement of a car thereon, and means for regulating the movement of said track-section, said regulating means being inter-connected, whereby operation of the one serves to operatively position the other.

49. In car-dumping mechanism, the combination of a pivotally mounted track-section, a movable stop thereon adapted to engage a car, and means for regulating the motion of said track-section and said stop, such means including a retarding device and means connecting the same with said movable stop whereby such device is positioned to engage said track-section by the movement of said stop.

50. In car-dumping mechanism, the combination of a pivotally mounted track-section, a movable stop thereon adapted to engage a car, and means for regulating the motion of said track-section and stop, such means comprising a cylinder provided with a pass-pipe, a piston working in said cylinder, and means connecting said piston with said movable stop whereby said piston is positioned to engage said track-section by the movement of said stop.

51. In car-dumping mechanism, the combination of a pivotally mounted track-section, a movable stop thereon adapted to engage a car, and means for regulating the motion of said track-section and stop, such means comprising a cylinder provided with a pass-pipe, a piston working in said cylinder, and a cable connecting said piston with said movable stop whereby said piston is positioned to engage said track-section by the movement of said stop.

52. Car-dumping mechanism including an oscillatory frame composed of two inwardly disposed channel-bars rigidly joined together, and a carriage mounted on said frame, the wheels of said carriage fitting within the channels of said bars.

53. Car-dumping mechanism including a fixed track-section, and a track-section pivotally mounted at the outer end of said fixed track-section and adapted to swing within the same.

54. Car-dumping mechanism including a fixed track-section composed of two channel bars having their channels disposed outwardly, and a track-section composed of two inwardly disposed channel-bars pivotally mounted at the outer end of said fixed track-section and adapted to swing within the same.

55. Car-dumping mechanism including a fixed track-section composed of two channel-bars having their channels disposed outwardly, a track-section pivotally mounted at the outer end of said fixed track-section, such pivotal track-section comprising two inwardly disposed channel-bars rigidly joined together, and a carriage mounted on said frame, the wheels of said carriage fitting within the channels of said bars.

56. Car-dumping mechanism including an oscillatory frame composed of two channel-bars similarly bent in a vertical plane at points intermediate of their ends and rigidly joined together with their channels disposed inwardly, and a carriage mounted on said frame, the wheels of said carriage fitting within the channels of said bars.

Signed by us, this 15th day of August 1905.

FRANK C. GREENE.
CHARLES G. PALMER.

Attested by—
A. E. MERKEL,
O. V. GREENE.